(12) United States Patent
Lin (10) Patent No.: US 10,904,906 B2
(45) Date of Patent: Jan. 26, 2021

(54) METHOD FOR TRANSMITTING DATA, TERMINAL DEVICE AND NETWORK DEVICE (71) Applicant: GUANGDONG OPPO MOBILE TELECOMMUNICATIONS CORP., LTD., Dongguan, Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/705,431

(22) Filed: Dec. 6, 2019

(65) Prior Publication Data

US 2020/0112976 A1    Apr. 9, 2020

Related U.S. Application Data

(63) Continuation of application No. PCT/CN2017/101955, filed on Sep. 15, 2017.

(51) Int. Cl.
*H04W 72/12* (2009.01)
*H04W 76/27* (2018.01)
(Continued)

(52) U.S. Cl.
CPC ....... *H04W 72/1257* (2013.01); *H04L 5/0092* (2013.01); *H04W 72/042* (2013.01);
(Continued)

(58) Field of Classification Search
CPC .. H04L 5/0091; H04W 16/02; H04W 72/042; H04W 72/1289; H04W 74/006; H04W 76/28
See application file for complete search history.

(56) References Cited

U.S. PATENT DOCUMENTS

2013/0077590 A1   3/2013   Xue et al.
2015/0208387 A1   7/2015   Awad et al.
(Continued)

FOREIGN PATENT DOCUMENTS

CN    101854639 A    10/2010
CN    105099634 A    11/2015
(Continued)

OTHER PUBLICATIONS

International Search Report (ISR) dated May 30, 2018 for Application No. PCT/CN2017/101955.
(Continued)

*Primary Examiner* — Raj Jain
(74) *Attorney, Agent, or Firm* — Ladas & Parry LLP (57) ABSTRACT

Embodiments of the present application disclose a method for transmitting data, a terminal device, and a network device, where the method includes: receiving, by a terminal device, first indication information sent by a network device, where the first indication information indicates that data is capable of being transmitted on a semi-persistent scheduling resource within a first bandwidth part BWP of at least one BWP and where the first BWP is in an active state; determining, by the terminal device, the semi-persistent scheduling resource within the first BWP according to the first indication information; and performing, by the terminal device, data transmission on the semi-persistent scheduling resource within the first BWP with the network device. The method, the terminal device and the network device in the embodiments of the present application are beneficial to improving an accuracy of data transmission.

24 Claims, 4 Drawing Sheets

(51) Int. Cl.
  *H04L 5/00*   (2006.01)
  *H04W 74/00*  (2009.01)
  *H04W 72/04*  (2009.01)

(52) U.S. Cl.
  CPC ..... *H04W 72/0453* (2013.01); *H04W 74/006* (2013.01); *H04W 76/27* (2018.02)

(56) References Cited

U.S. PATENT DOCUMENTS

| | | | |
|---|---|---|---|
| 2015/0365209 A1* | 12/2015 | Yi | H04L 5/001 370/329 |
| 2016/0323087 A1 | 11/2016 | Kim et al. | |
| 2017/0339677 A1* | 11/2017 | Rico Alvarino | H04L 5/0053 |
| 2019/0349115 A1* | 11/2019 | Lin | H04L 1/0071 |
| 2020/0022115 A1* | 1/2020 | Park | H04W 72/0453 |

FOREIGN PATENT DOCUMENTS

| | | |
|---|---|---|
| CN | 106470399 A | 3/2017 |
| CN | 106851744 A | 6/2017 |
| CN | 110447175 A | 6/2017 |
| RU | 2575391 | 2/2016 |
| WO | 2013017046 A2 | 2/2013 |
| WO | 2018121621 A1 | 7/2018 |

OTHER PUBLICATIONS

3GPP TR38.912 V14.1.0 (Jun. 2017), 3rd Generation Partnership Project; Technical Specification Group Radio Access Network; Study on New Radio (NR) access technology (Release 14).

The first OA of the parallel TW application 107132549 dated Jul. 15, 2019.

The EESR of corresponding European appiication No. 17925122.8. dated Apr. 24, 2020.

Ericsson: "Grant Free and Semi-Persistent Scheduling in NR", 3GPP Draft; R2-1708350-Grant Free and Semi-Persistent Scheduling in NR, 3rd Generation Partnership Project (3GPP), Mobile Competence Centre; 650, Route Des Lucioles; F-06921 Sophia-Antipolis Cedex, vol. RAN WG2, No. Berlin, Germany; Aug. 21, 2017-Aug. 25, 2017 Aug. 20, 2017(Aug. 20, 2017), XP051318231, 6 pages.

Mediatek Inc:"Remaining Details on Bandwidth Part Operation in NR", 3GPP Draft; R1-1716202_Remaining Details on Bandwidth Part Operation in NR, 3rd Generation Partnership Project (3GPP), Mobile Competence Centre; 650, Route Desluciole F-08921 Sophia-Antipolis Ced, vol. RAN WG1, No. Nagoya, Japan; Sep. 18, 2017-Sep. 21, 2017 Sep. 12, 2017(Sep. 12, 2017), XP051329825, 9 pages.

Ericsson, R1-1711795; On bandwidth parts and "RF" requirements, 3GPP TSG RAN1 NR Ad-Hoc#2 Qingdao, P.R. China Jun. 27-30, 2017, 9 pages.

R2-1707624_R1-1711998; LS on Bandwidth Part Operation in NR, 3 pages, Jun. 30, 2017.

The first Office Action of corresponding European application No. 17925122.8, dated Oct. 7, 2020.

The Notice of Allowence of corresponding Russian application No. 2020109772, dated Oct. 21, 2020.

The First Office Action of corresponding Chinese application No. 202010090473.0, dated Nov. 3, 2020.

\* cited by examiner

METHOD FOR TRANSMITTING DATA, TERMINAL DEVICE AND NETWORK DEVICE

CROSS-REFERENCE TO RELATED APPLICATIONS

This application is a continuation of International Application No. PCT/CN2017/101955, filed on Sep. 15, 2017, entitled "METHOD FOR TRANSMITTING DATA, TERMINAL DEVICE AND NETWORK DEVICE", the content of which is incorporated herein by reference in its entirety.

TECHNICAL FIELD

Embodiments of the present application relate to the field of communications, and in particular, to a method for transmitting data, a terminal device, and a network device.

BACKGROUND

In Long Term Evolved (LTE), a network device configures a Semi-Persistent Scheduling (SPS) resource within a system bandwidth for a terminal device to transmit data. In New Radio (NR), because a system bandwidth that can be supported by the terminal device is much larger than a maximum system bandwidth of 20 MHz of LTE, a concept of Bandwidth Part (BWP) is introduced for the purpose of improving scheduling efficiency. In a Radio Resource Control (RRC) connection state, the network configures one or more BWPs for the terminal. How the terminal device uses the SPS resource in an activated BWP to transmit data is a problem that needs to be solved.

SUMMARY

In view of the above, embodiments of the present application provides a method for transmitting data, a terminal device, and a network device, which are beneficial to improving an accuracy of data transmission.

In a first aspect, a method for transmitting data is provided, the method includes: receiving, by a terminal device, first indication information sent by a network device, where the first indication information indicates that data is capable of being transmitted on a semi-persistent scheduling resource in a first bandwidth part BWP of at least one BWP and where the first BWP is in an active state; determining, by the terminal device, the semi-persistent scheduling resource within the first BWP according to the first indication information; and performing, by the terminal device, data transmission on the semi-persistent scheduling resource within the first BWP with the network device.

In a case that a BWP is activated, the obtaining of the SPS resource under the BWP is triggered by the network device, which is beneficial to improving the accuracy of data transmission.

BWP is a concept of frequency domain dimension. Different BWPs may be different in at least one of the following parameters: numerology, a center frequency point, and a bandwidth.

The network device can configure one or more BWPs for the terminal device, and the network device can configure corresponding SPS resources for different BWPs at the same time.

In a possible implementation, the at least one BWP includes a plurality of BWPs, and the first indication information further indicates that an operating BWP of the terminal device is switched from a second BWP of the plurality of BWPs to the first BWP.

In a possible implementation, the at least one BWP includes a plurality of BWPs, and before the receiving, by the terminal device, the first indication information sent by the network device, the method further includes: receiving, by the terminal device, second indication information sent by the network device, where the second indication information indicates that an operating BWP of the terminal device is switched from a second BWP of the plurality of BWPs to the first BWP.

In a possible implementation, the determining, by the terminal device, the semi-persistent scheduling resource within the first BWP according to the first indication information, includes: determining, by the terminal device, a frequency domain location of the semi-persistent scheduling resource within the first BWP according to the first indication information; and where the performing, by the terminal device, data transmission on the semi-persistent scheduling resource within the first BWP with the network device, includes: performing, by the terminal device, on the semi-persistent scheduling resource within the first BWP, the data transmission with the network device at a pre-configured period.

In a possible implementation, after the terminal device receives the second indication information and before the terminal device receives the first indication information, the semi-persistent scheduling resource within the first BWP is in an inactive state.

In a possible implementation, the semi-persistent scheduling resource includes at least one of an uplink resource or a downlink resource.

In a possible implementation, the first indication information is carried in downlink control information DCI or a radio resource control RRC signaling.

In a possible implementation, the determining, by the terminal device, the semi-persistent scheduling resource within the first BWP according to the first indication information, includes: determining, by the terminal device, the semi-persistent scheduling resource within the first BWP according to a pre-configuration by the network device after receiving the first indication information sent by the network device.

In a second aspect, a method for transmitting data is provided, the method includes: sending, by a network device, first indication information to a terminal device, where the first indication information indicates that the terminal device is capable of transmitting data on a semi-persistent scheduling resource within a first bandwidth part BWP of a plurality of BWPs and where the first BWP is in an active state.

In a possible implementation, the first indication information further indicates that an operating BWP of the terminal device is switched from a second BWP of the plurality of BWPs to the first BWP.

In a possible implementation, before the sending, by the network device, the first indication information to the terminal device, the method further includes: sending, by the network device, second indication information to the terminal device, where the second indication information indicates that an operating BWP of the terminal device is switched from a second BWP of the plurality of BWPs to the first BWP.

In a possible implementation, the first indication information is carried in downlink control information DCI or a radio resource control RRC signaling.

In a possible implementation, after the network device sends the second indication information and before the network device sends the first indication information, the semi-persistent scheduling resource within the first BWP is in an inactive state.

In a possible implementation, the semi-persistent scheduling resource includes at least one of an uplink resource or a downlink resource.

In a possible implementation, the method further includes: configuring, by the network device, the semi-persistent scheduling resource within the first BWP for the terminal device through a RRC signaling.

In a third aspect, a terminal device is provided for performing the method according to the above first aspect or any possible implementation of the first aspect. In particular, the terminal device includes units for performing the method according to the above first aspect or any possible implementation of the first aspect.

In a fourth aspect, a network device is provided for performing the method according to the above second aspect or any possible implementation of the second aspect. In particular, the network device includes units for performing the method according to the above second aspect or any possible implementation of the second aspect.

In a fifth aspect, a terminal device is provided, the terminal device includes: a memory, a processor, an input interface, and an output interface. The memory, the processor, the input interface, and the output interface are connected through a bus system. The memory is configured to store instructions, the processor is configured to execute the instructions stored by the memory for performing the method according to the above first aspect or any possible implementation of the first aspect.

In a sixth aspect, a network device is provided, the network device includes: a memory, a processor, an input interface, and an output interface. The memory, the processor, the input interface, and the output interface are connected through a bus system. The memory is configured to store instructions, the processor is configured to execute the instructions stored by the memory for performing the method according to the above second aspect or any possible implementation of the second aspect.

In a seventh aspect, a computer storage medium is provided for storing computer software instructions used for performing the method according to the above first aspect or any possible implementation of the first aspect, or the method according to the above second aspect or any possible implementation of the second aspect, which include a program designed for performing the above aspects.

In an eighth aspect, a computer program product including instructions is provided, which when executed on a computer, causes the computer to perform the method according to the above first aspect or any optional implementation of the first aspect, or the method according to the above second aspect or any optional implementation of the second aspect.

These and other aspects of the present application will be more readily apparent from the following description of the embodiments.

DESCRIPTION OF EMBODIMENTS

Technical solutions in the embodiments of the present application will be clearly and completely described in the following with reference to the accompanying drawings in the embodiments of the present application.

It should be understood that the technical solutions of the embodiments of the present application can be applied to various communication systems, such as a Global System of Mobile communication (GSM) system, a Code Division Multiple Access (CDMA) system, a Wideband Code Division Multiple Access (WCDMA) system, General Packet Radio Service (GPRS), an LTE system, an LTE Frequency Division Duplex (FDD) system, a Time Division Duplex (TDD), a Universal Mobile Telecommunication System (UMTS), a Worldwide Interoperability for Microwave Access (WiMAX) communication system, a New Radio (NR) or a future 5G system, etc.

In particular, the technical solutions of the embodiments of the present application can be applied to various communication systems based on a non-orthogonal multiple access technology, such as a Sparse Code Multiple Access (SCMA) system, and a Low Density Signature (LDS) system, etc. Of course, the SCMA system and the LDS system may also be referred to as other names in the communication field. Further, the technical solutions of the embodiments of the present application can be applied to multi-carrier transmission system using the non-orthogonal multiple access technology, for example, Orthogonal Frequency Division Multiplexing (OFDM), Filter Bank Multi-Carrier (FBMC), Generalized Frequency Division Multiplexing (GFDM), Filtered-OFDM (F-OFDM) system, and the like, using the non-orthogonal multiple access technology.

A terminal device in the embodiments of the present application may refer to a User Equipment (UE), an access terminal, a subscriber unit, a subscriber station, a mobile radio station, a mobile station, a remote station, a remote terminal, a mobile device, a user terminal, a terminal, a wireless communication device, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices, in-vehicle devices, wearable devices connected to wireless modems, a terminal device in future 5G network, or a terminal device in a future evolved Public Land Mobile Network (PLMN), and the like, which is not limited in the embodiments of the present application.

A network device in the embodiments of the present application may be a device for communicating with the terminal device, where the network device may be a base station (Base Transceiver Station, BTS) in GSM or CDMA, or may be a base station (NodeB, NB) in a WCDMA system, the network device may also be an evolutional base station (Evolutional NodeB, eNB or eNodeB) in the LTE system, and may also be a wireless controller in a Cloud Radio Access Network (CRAN) scenario, or the network device may be a relay station, an access point, an in-vehicle device, a wearable device, and a network device in the future 5G network or a network device in the future evolved PLMN network, which is not limited in the embodiments of the present application.

Figure 1:
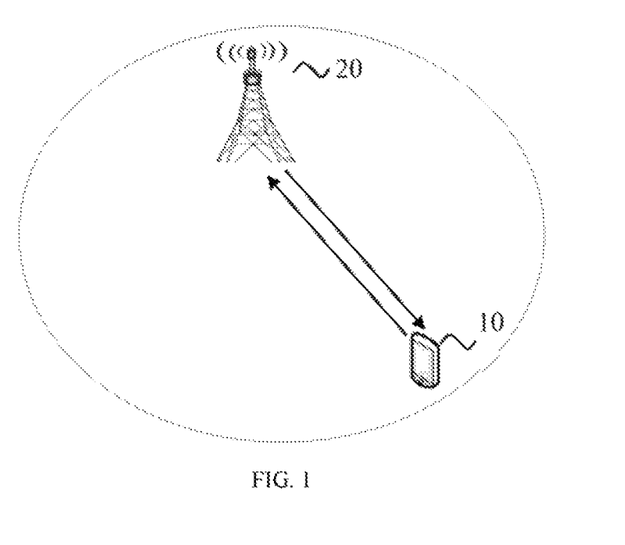
FIG. 1 shows a schematic diagram of an application scenario according to an embodiment of the present application.

FIG. 1 is a schematic diagram of an application scenario according to an embodiment of the present application. A communication system in FIG. 1 may include a terminal device 10 and a network device 20. The network device 20 is configured to provide communication services for the terminal device 10 and access a core network. The terminal device 10 accesses the network by searching for a synchronization signal, a broadcast signal, and the like sent by the network device 20, thereby performing communication with the network. Arrows shown in FIG. 1 may represent uplink/downlink transmissions through a cellular link between the terminal device 10 and the network device 20.

SPS is different from dynamic scheduling in that it can semi-persistently configure a radio resource and periodically allocate the resource to a fixed UE. Briefly, once a resource in a scheduling unit is allocated to a UE by an eNodeB, the UE can receive or send data on a fixed resource in each scheduling unit. The SPS does not need to send Downlink Control Information (DCI) to the UE in each scheduling unit, thus reducing overhead of control signaling.

In the LTE, the SPS resource allocated by the network device to the terminal device covers an entire system bandwidth. In NR, a system bandwidth supported by the terminal is much larger than the maximum system bandwidth of 20 MHz supported by the terminal in the LTE. For some terminals, due to limited capabilities, it is not always possible to support the full system bandwidth. In order to improve scheduling efficiency, a concept of BWP is introduced in the NR, and BWP is a concept of frequency domain dimension. Different BWPs may be different in at least one of the following parameters: numerology, a center frequency point, and a bandwidth. In a RRC connection state, the network can configure one or more BWPs for the terminal. At one point in time, the terminal can only support one activated BWP. The so-called activation of a BWP means that the terminal can receive a signal in a frequency band specified by a BWP, the signal including data transmission, a system message, and the like.

Since different BWPs have different frequency bands, the SPS resource allocated by the network is of course not applicable to all BWPs. Therefore, the corresponding SPS resource should be respectively allocated for each BWP. When a certain BWP is activated, how the terminal device obtains the SPS resource within the BWP is a problem that needs to be solved.

Figure 2:
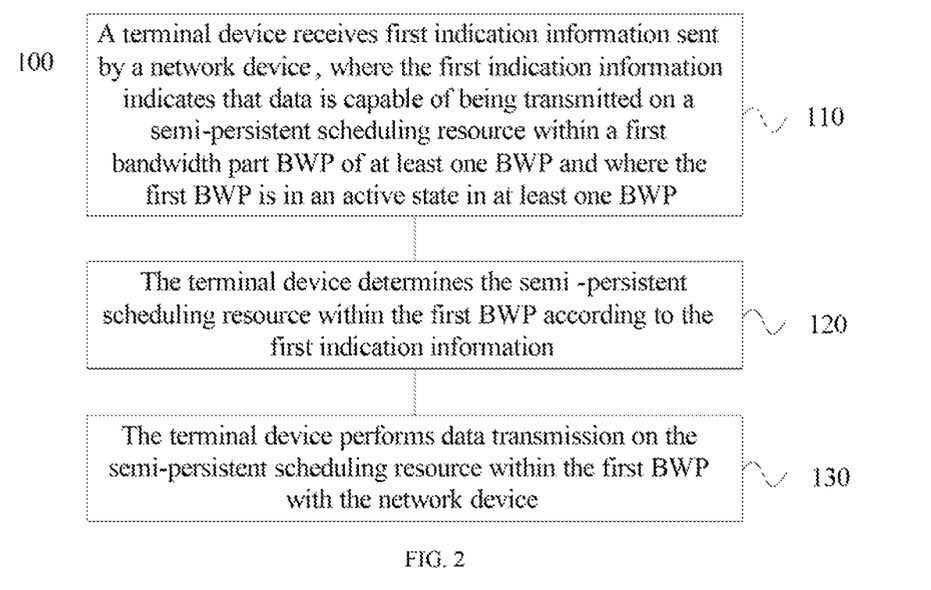
FIG. 2 shows a schematic block diagram of a method for transmitting data according to an embodiment of the present application.

FIG. 2 shows a schematic block diagram of a method 100 for transmitting data in an embodiment of the present application. As shown in FIG. 2, the method 100 includes parts or all of the following contents:

S110, a terminal device receives first indication information sent by a network device, where the first indication information indicates that data is capable of being transmitted on a semi-persistent scheduling resource within a first bandwidth part BWP of at least one BWP and where the first BWP is in an active state;

S120, the terminal device determines the semi-persistent scheduling resource within the first BWP according to the first indication information; and S130, the terminal device performs data transmission on the semi-persistent scheduling resource within the first BWP with the network device.

Specifically, the network device may configure one or more BWPs for the terminal device, and can configure different SPS resources for each BWP. For example, at least one of a frequency domain location of the SPS resource or a period of the SPS resource may be configured under each BWP. When the terminal device determines which BWP is in the active state, the network device may send trigger information to the terminal device to trigger the terminal device to determine a SPS resource within a corresponding BWP. The trigger information is namely the above indication information, which may be configured to activate the SPS resource within the BWP, or configured to inform the terminal device that data is capable of being transmitted on the SPS resource within the BWP. The terminal device obtains location information of the SPS resource within the BWP according to the trigger information, and then the terminal device is capable of receiving or sending data on the SPS resource.

Therefore, according to the method for transmitting data in the embodiment of the present application, in a case that a BWP is activated, the obtaining of the SPS resource under the BWP is triggered by the network device, which is beneficial to improving the accuracy of data transmission.

In an embodiment of the present application, the at least one BWP is a plurality of BWPs, and the first indication information further indicates that an operating BWP of the terminal device is switched from a second BWP of the plurality of BWPs to the first BWP.

In an embodiment of the present application, the at least one BWP is a plurality of BWPs, and before the terminal device receives the first indication information sent by the network device, the method further includes: the terminal device receives second indication information sent by the network device, where the second indication information indicates that an operating BWP of the terminal device is switched from a second BWP of the plurality of BWPs to the first BWP.

When the network device configures a plurality of BWPs for the terminal device, the network device may cause the terminal device to switch between a plurality of BWPs by sending an instruction to the terminal device, that is, by deactivating the current one BWP and activating another BWP.

Such indication manner may include RRC signaling, Downlink Control Information (DCI), or Media Access Control (MAC) signaling, and the like. Alternatively, the terminal device can also be configured with a timer, that is, it can be switched between different BWPs according to a certain time rule. When the network device indicates a switch to the terminal device, that is, information of a BWP to be activated may be informed, for example, the information may be an identifier, or may be at least one of a central frequency point, bandwidth information, or numerology of the BWP to be activated.

The indication information for triggering the terminal device to obtain the SPS resource within the corresponding BWP may multiplex the indication information for activating the BWP, or may be different bits in a piece of information with respect to the indication information for activating the BWP, or may be two separate information, which is not limited in the embodiments of the present application.

When the indication information for triggering the terminal device to obtain the SPS resource in the corresponding BWP is different from the indication information for activating the BWP, the two indication information may be sent to the terminal device through the above RRC signaling, DCI, or MAC signaling.

In an embodiment of the present application, after the terminal device receives the second indication information and before the terminal device receives the first indication information, the semi-persistent scheduling resource within the first BWP is in an inactive state.

Each time the terminal device activates one BWP, the data can be transmitted on the SPS resource in the corresponding BWP only in a case that the first indication information is received. Otherwise, when activating a BWP, the terminal device can consider that the SPS resource within the BWP is prohibited from use, that is, in the inactive state.

When the terminal device switches from one BWP to another BWP, the SPS resource within a previous BWP may be in the active state, that is, the data is capable of being transmitted on the SPS resource within the previous BWP, and the SPS resource in the previous BWP may also be in the inactive state. In other words, when an operating BWP of the terminal device is the previous BWP, the SPS resource in the previous BWP is prohibited from transmitting data.

In an embodiment of the present application, the terminal device determining the semi-persistent scheduling resource within the first BWP according to the first indication information includes the terminal device determining a frequency domain location of the semi-persistent scheduling resource within the first BWP according to the first indication information; and where the terminal device performing the data transmission on the semi-persistent scheduling resource within the first BWP includes: the terminal device performing the data transmission on the semi-persistent scheduling resource within the first BWP with the network device at a pre-configured period.

As mentioned above, the SPS resource is a semi-persistently configured fixed frequency band, and the fixed frequency band resource is periodically allocated to a fixed UE. Then, in an embodiment of the present application, after the terminal device determines the current operating BWP, the terminal device may first determine the frequency domain location of the SPS resource corresponding to the operating BWP, and then the terminal device may periodically perform data transmission on the SPS resource. The period may be configured by the network device or may be pre-stored in the terminal device according to a protocol agreement.

In an embodiment of the present application, the SPS resource may be an uplink resource, that is, a resource configured to transmit uplink data, or may be a downlink resource, that is, a resource configured to transmit downlink data.

In an embodiment of the present application, the determining, by the terminal device, the semi-persistent scheduling resource within the first BWP according to the first indication information includes: determining the semi-persistent scheduling resource within the first BWP according to a pre-configuration by the network device after receiving the first indication information sent by the network device.

Specifically, the network device may configure the SPS resources within the different BWPs in advance, for example, may configure a period, a frequency domain resource, or may also be various parameters such as Modulation and Coding Scheme (MCS) for transmitting data, and the like, for the terminal device through a RRC signaling.

Figure 3:
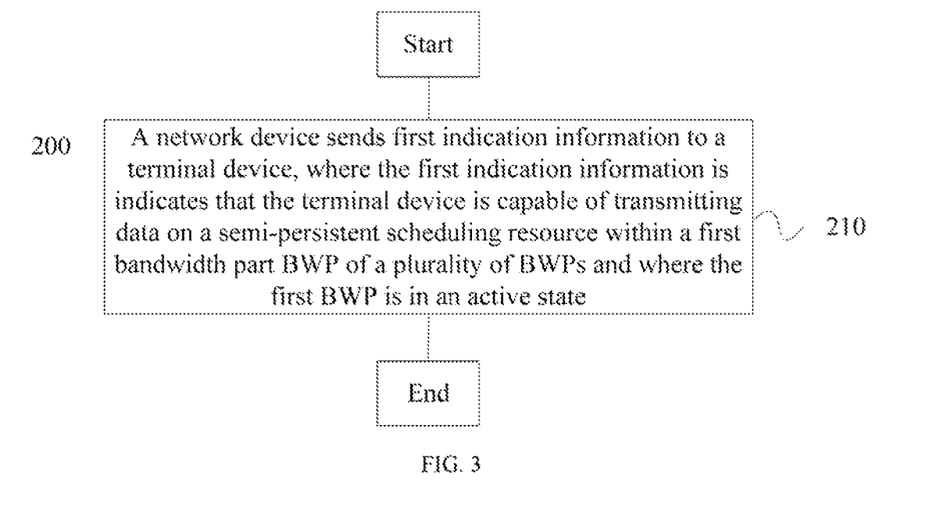
FIG. 3 shows another schematic block diagram of a method for transmitting data according to an embodiment of the present application.

FIG. 3 shows a schematic block diagram of a method 200 for transmitting data according to an embodiment of the present application. As shown in FIG. 3, the method 200 includes parts or all of the following contents:

S210, a network device sends first indication information to a terminal device, where the first indication information indicates that the terminal device is capable of transmitting data on a semi-persistent scheduling resource within a first bandwidth part BWP of a plurality of BWPs and where the first BWP is in an active state.

Therefore, according to the method for transmitting data in the embodiment of the present application, in a case that a BWP is activated, the obtaining of the SPS resource under the BWP is triggered by the network device, which is beneficial to improving the accuracy of data transmission.

In an embodiment of the present application, the first indication information further indicates that an operating BWP of the terminal device is switched from a second BWP of the plurality of BWPs to the first BWP.

In an embodiment of the present application, before the network device sends the first indication information to the terminal device, the method further includes: the network device sends second indication information to the terminal device, where the second indication information indicates that an operating BWP of the terminal device is switched from a second BWP of the plurality of BWPs to the first BWP.

In an embodiment of the present application, the first indication information is carried in downlink control information (DCI) or a radio resource control (RRC) signaling.

In an embodiment of the present application, after the network device sends the second indication information and before the network device sends the first indication information, the semi-persistent scheduling resource within the first BWP is in an inactive state.

In an embodiment of the present application, the semi-persistent scheduling resource includes at least one of an uplink resource or a downlink resource.

In an embodiment of the present application, the method further includes:

the network device configures the semi-persistent scheduling resource within the first BWP for the terminal device through a RRC signaling.

It should be understood that the interaction between the network device and the terminal device described on the network device, relevant characteristics and functions thereof correspond to relevant characteristics and functions on the terminal device, and the related content has been described in detail in method 100 above. For brevity, details will not be described herein.

It should also be understood that, in various embodiments of the present application, the sequence numbers of the above processes do not imply an execution order. The execution order of the processes should be determined by their functions and internal logic, but is not intended to limit an implementation in the embodiments of the present application.

The method for transmitting data according to the embodiment of the present application is described in detail above. Hereinafter, an apparatus for transmitting data according to an embodiment of the present application will be described with reference to FIG. 4 to FIG. 7. The technical features described in the method embodiment are applicable to the following apparatus embodiment.

Figure 4:
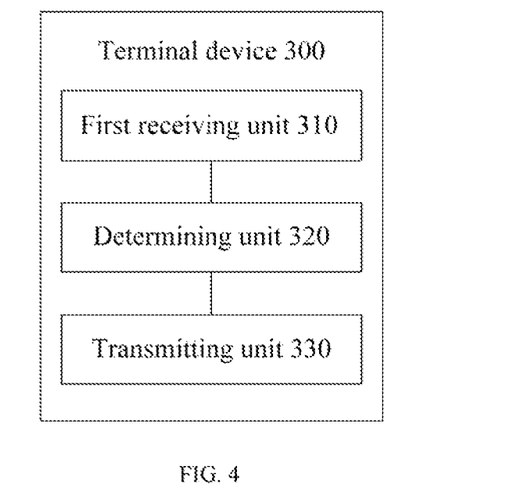
FIG. 4 shows a schematic block diagram of a terminal device according to an embodiment of the present application.

FIG. 4 shows a schematic block diagram of a terminal device 300 according to an embodiment of the present application. As shown in FIG. 4, the terminal device 300 includes: a first receiving unit 310, configured to receive first indication information sent by a network device, where the first indication information indicates that data is capable of being transmitted on a semi-persistent scheduling resource within a first bandwidth part BWP of at least one BWP and where the first BWP is in an active state in at least one BWP;

a determining unit 320, configured to determine the semi-persistent scheduling resource within the first BWP according to the first indication information; and a transmitting unit 330, configured to perform data transmission on the semi-persistent scheduling resource within the first BWP with the network device.

Therefore, according to the terminal device of the embodiment of the present application, in a case that a BWP is activated, the obtaining of the SPS resource under the BWP is triggered by the network device, which is beneficial to improving the accuracy of data transmission.

In an embodiment of the present application, the at least one BWP is a plurality of BWPs, and the first indication information further indicates that an operating BWP of the terminal device is switched from a second BWP of the plurality of BWPs to the first BWP.

In an embodiment of the present application, the at least one BWP is a plurality of BWPs, and the terminal device further includes: a second receiving unit, configured to receive second indication information sent by the network device, where the second indication information indicates that an operating BWP of the terminal device is switched from a second BWP of the plurality of BWPs to the first BWP.

In an embodiment of the present application, the determining unit is specifically configured to: determine a frequency domain location of the semi-persistent scheduling resource within the first BWP according to the first indication information; and where the transmitting unit is specifically configured to: perform, on the semi-persistent scheduling resource within the first BWP, the data transmission with the network device at a pre-configured period.

In an embodiment of the present application, after the second receiving unit receives the second indication information and before the first receiving unit receives the first indication information, the semi-persistent scheduling resource within the first BWP is in an inactive state.

In an embodiment of the present application, the semi-persistent scheduling resource includes at least one of an uplink resource or a downlink resource.

In an embodiment of the present application, the first indication information is carried in downlink control information (DCI) or a radio resource control (RRC) signaling.

In an embodiment of the present application, the determining unit is specifically configured to: determine the semi-persistent scheduling resource within the first BWP according to a pre-configuration by the network device after the first indication information sent by the network device is received.

It should be understood that the terminal device 300 according to the embodiment of the present application may correspond to the terminal device in the method embodiment of the present application, and the above and other operations and/or functions of the units in the terminal device 300 respectively implement the corresponding process of the terminal device in the method of FIG. 2. For brevity, details will not be described herein.

Figure 5:
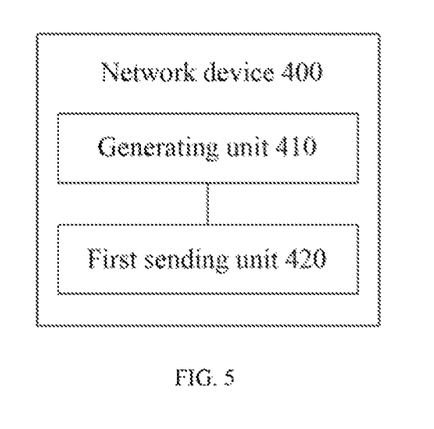
FIG. 5 shows a schematic block diagram of a network device according to an embodiment of the present application.

FIG. 5 shows a schematic block diagram of a network device 400 according to an embodiment of the present application. As shown in FIG. 5, the network device 400 includes:

a generating unit 410, configured to generate first indication information, where the first indication information indicates that a terminal device is capable of transmitting data on a semi-persistent scheduling resource within a first bandwidth part BWP of a plurality of BWPs and where the first BWP is in an active state; and a first sending unit 420, configured to send the first indication information to the terminal device.

Therefore, according to the network device of the embodiment of the present application, in a case that a BWP is activated, the obtaining of the SPS resource under the BWP is triggered by the network device, which is beneficial to improving the accuracy of data transmission.

In an embodiment of the present application, the first indication information further indicates that an operating BWP of the terminal device is switched from a second BWP of the plurality of BWPs to the first BWP.

In an embodiment of the present application, the network device further includes: a second sending unit, configured to send second indication information to the terminal device, where the second indication information indicates that an operating BWP of the terminal device is switched from a second BWP of the plurality of BWPs to the first BWP.

In an embodiment of the present application, the first indication information is carried in downlink control information DCI or a radio resource control RRC signaling.

In an embodiment of the present application, after the second sending unit sends the second indication information and before the first sending unit sends the first indication information, the semi-persistent scheduling resource within the first BWP is in an inactive state.

In an embodiment of the present application, the semi-persistent scheduling resource includes at least one of an uplink resource or a downlink resource.

In an embodiment of the present application, the network device further includes:

a configuration unit, configured to configure the semi-persistent scheduling resource within the first BWP for the terminal device through a RRC signaling.

It should be understood that the network device 400 according to the embodiment of the present application may correspond to the network device in the method embodiment of the present application, and the above and other operations and/or functions of the units in the network device 400 respectively implement the corresponding process of the terminal device in the method of FIG. 3. For brevity, details will not be described herein.

Figure 6:
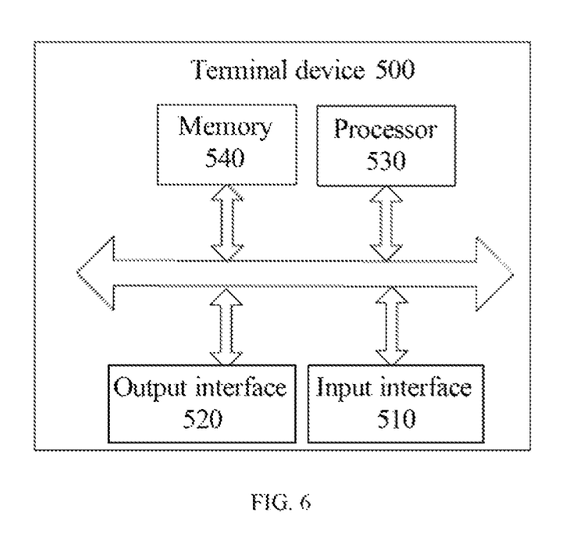
FIG. 6 shows another schematic block diagram of a terminal device according to an embodiment of the present application.

As shown in FIG. 6, an embodiment of the present application further provides a terminal device 500, which may be the terminal device 300 in FIG. 4, which can be configured to execute the content of the terminal device corresponding to the method 100 in FIG. 2. The terminal device 500 includes an input interface 510, an output interface 520, a processor 530, and a memory 540. The input interface 510, the output interface 520, the processor 530, and the memory 540 can be connected through a bus system. The memory 540 is configured to store programs, instructions or codes. The processor 530 is configured to execute the programs, the instructions or the codes in the memory 540 to control the input interface 510 to receive a signal, control the output interface 520 to send a signal, and complete the operations in the foregoing method embodiment.

Therefore, according to the terminal device of the embodiment of the present application, in a case that a BWP is activated, the obtaining of the SPS resource under the BWP is triggered by the network device, which is beneficial to improving the accuracy of data transmission.

It should be understood that, in the embodiment of the present application, the processor 530 may be a Central Processing Unit (CPU), and the processor 530 may also be other general-purpose processors, digital signal processors, application specific integrated circuits, field-programmable gate array or other programmable logic devices, discrete gates or transistor logic devices, discrete hardware components, and the like. The general purpose processor may be a microprocessor or the processor may be any conventional processor, and the like.

The memory 540 can include read only memory and random access memory, and provide instructions and data to the processor 530. A portion of the memory 540 may also include a non-volatile random access memory. For example, the memory 540 can also store information about device type.

During an implementation, the steps of the above method may be completed by an integrated logic circuit of hardware in the processor 530 or an instruction in the form of software. The content with reference to the method disclosed in the embodiments of the present application may be directly implemented by a hardware processor, or may be implemented by a combination of hardware and software modules in the processor. The software module may be located in a mature storage medium in the art, such as a random access memory, a flash memory, a read-only memory, a programmable read-only memory or an electrically erasable programmable memory, a register, or the like. The storage medium is located in the memory 540, and the processor 530 reads information in the memory 540 and completes the steps of the above method with reference to its hardware. To avoid redundancy, details will not be described herein.

In a specific implementation, the determining unit in the terminal device 300 can be implemented by the processor 630 in FIG. 6. The first receiving unit and the second receiving unit in the terminal device 300 may be implemented by the input interface 610 in FIG. 6. The transmitting unit in the terminal device 300 can be implemented by the output interface 620 in FIG. 6.

Figure 7:
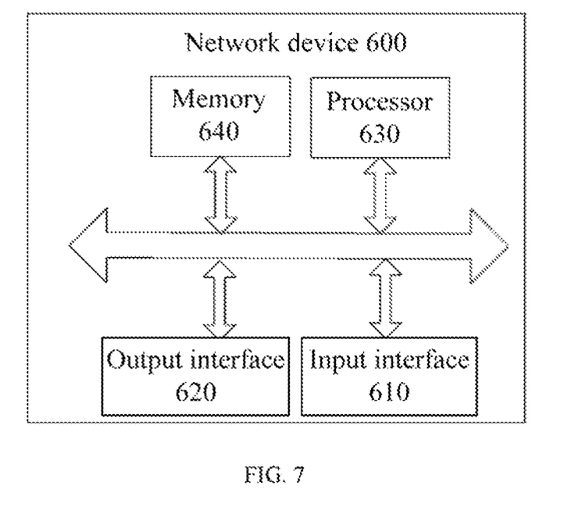
FIG. 7 shows another schematic block diagram of a network device according to an embodiment of the present application.

As shown in FIG. 7, an embodiment of the present application further provides a network device 600, which may be the network device 400 in FIG. 5, which can be configured to execute the content of the network device corresponding to the method 200 in FIG. 3. The network device 600 includes an input interface 610, an output interface 620, a processor 630, and a memory 640. The input interface 610, the output interface 620, the processor 630, and the memory 640 can be connected through a bus system. The memory 640 is configured to store programs, instructions or codes. The processor 630 is configured to execute the programs, the instructions or the codes in the memory 640 to control the input interface 610 to receive a signal, control the output interface 620 to send a signal, and complete the operations in the foregoing method embodiment.

Therefore, according to the network device of the embodiment of the present application, in a case that a BWP is activated, the obtaining of the SPS resource under the BWP is triggered by the network device, which is beneficial to improving the accuracy of data transmission.

It should be understood that, in the embodiment of the present application, the processor 630 may be a Central Processing Unit (CPU), and the processor 630 may also be other general-purpose processors, digital signal processors, application specific integrated circuits, field-programmable gate array or other programmable logic devices, discrete gates or transistor logic devices, discrete hardware components, and the like. The general purpose processor may be a microprocessor or the processor may be any conventional processor, and the like.

The memory 640 can include read only memory and random access memory, and provide instructions and data to the processor 630. A portion of the memory 640 may also include a non-volatile random access memory. For example, the memory 640 can also store information about device type.

During an implementation, the steps of the above method may be completed by an integrated logic circuit of hardware in the processor 630 or an instruction in the form of software. The content with reference to the method disclosed in the embodiments of the present application may be directly implemented by a hardware processor or may be implemented by a combination of hardware and software modules in the processor. The software module may be located in a mature storage medium in the art, such as a random access memory, a flash memory, a read-only memory, a programmable read-only memory or an electrically erasable programmable memory, a register, or the like. The storage medium is located in the memory 640, and the processor 630 reads information in the memory 640 and completes the steps of the above method with reference to its hardware. To avoid redundancy, details will not be described herein.

In a specific implementation, the first sending unit and the second sending unit in the network device 400 may be implemented by the output interface 620 in FIG. 7, and the generating unit and the configuring unit in the network device 400 may be implemented by the processor 630 in FIG. 7.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, for specific operation processes of the systems, the apparatuses and the units described above, reference may be made to the corresponding processes in the above method embodiments, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solutions of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present invention contributing to the prior art, or a part of the technical solution may be embodied in the form of a software product which is stored in a storage medium, including instructions for enabling a computer device (which may be a personal computer, a server, or a network device, etc.) to perform all or part of the steps of the embodiments of the present application. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present application, but the protection scope of the present application is not limited thereto. Any modification or substitution conceived by persons skilled in the art within the technical scope of the present application should be covered in the protection scope of the present application. Therefore, the protection scope of the present application is subject to the protection scope of the appended claims.

What is claimed is:

1. A method for transmitting data, comprising:
receiving, by a terminal device, first indication information sent by a network device, wherein the first indication information indicates that data is capable of being transmitted on a semi-persistent scheduling resource within a first bandwidth part (BWP) of a plurality of BWPs and wherein the first BWP is in an active state;
determining, by the terminal device, the semi-persistent scheduling resource within the first BWP according to the first indication information; and
performing, by the terminal device, data transmission on the semi-persistent scheduling resource within the first BWP with the network device;
wherein before the receiving, by the terminal device, the first indication information sent by the network device, the method further comprises:
receiving, by the terminal device, second indication information sent by the network device, wherein the second indication information indicates that an operating BWP of the terminal device is switched from a second BWP of the plurality of BWPs to the first BWP.

2. The method according to claim 1, wherein the determining, by the terminal device, the semi-persistent scheduling resource within the first BWP according to the first indication information, comprises:
determining, by the terminal device, a frequency domain location of the semi-persistent scheduling resource within the first BWP according to the first indication information; and
wherein the performing, by the terminal device, data transmission on the semi-persistent scheduling resource within the first BWP with the network device, comprises:
performing, by the terminal device, on the semi-persistent scheduling resource within the first BWP, the data transmission with the network device at a pre-configured period.

3. The method according to claim 1, wherein after the terminal device receives the second indication information and before the terminal device receives the first indication information, the semi-persistent scheduling resource within the first BWP is in an inactive state.

4. The method according to claim 1, wherein the semi-persistent scheduling resource comprises at least one of an uplink resource or a downlink resource.

5. The method according to claim 1, wherein the first indication information is carried in downlink control information (DCI).

6. The method according to claim 1, wherein the determining, by the terminal device, the semi-persistent scheduling resource within the first BWP according to the first indication information, comprises:
determining, by the terminal device, the semi-persistent scheduling resource within the first BWP according to a pre-configuration by the network device after receiving the first indication information sent by the network device.

7. The method according to claim 1, wherein the method further comprises:
receiving, by the terminal device, a RRC signaling sent by the network device, wherein the RRC signaling is used to configure the semi-persistent scheduling resource within the first BWP for the terminal device.

8. A method for transmitting data, comprising:
sending, by a network device, first indication information to a terminal device, wherein the first indication information indicates that the terminal device is capable of transmitting data on a semi-persistent scheduling resource within a first bandwidth part (BWP) of a plurality of BWPs and wherein the first BWP is in an active state;
wherein before the sending, by the network device, the first indication information to the terminal device, the method further comprises:
sending, by the network device, second indication information to the terminal device, wherein the second indication information indicates that an operating BWP of the terminal device is switched from a second BWP of the plurality of BWPs to the first BWP.

9. The method according to claim 8, wherein the first indication information is carried in downlink control information (DCI).

10. The method according to claim 8, wherein after the network device sends the second indication information and before the network device sends the first indication information, the semi-persistent scheduling resource within the first BWP is in an inactive state.

11. The method according to claim 8, wherein the semi-persistent scheduling resource comprises at least one of an uplink resource or a downlink resource.

12. The method according to claim 8, wherein the method further comprises:

configuring, by the network device, the semi-persistent scheduling resource within the first BWP for the terminal device through a RRC signaling.

13. A terminal device, comprising an input interface, an output interface, a processor, and a memory, wherein:
the memory has executable instructions stored thereon that when executed by the processor cause the input interface to receive first indication information sent by a network device, wherein the first indication information indicates that data is capable of being transmitted on a semi-persistent scheduling resource within a first bandwidth part (BWP) of a plurality of BWPs and wherein the first BWP is in an active state;
the memory further has executable instructions stored thereon that when executed by the processor cause the processor to determine the semi-persistent scheduling resource within the first BWP according to the first indication information; and
the memory further has executable instructions stored thereon that when executed by the processor cause the input interface and the output interface to perform data transmission on the semi-persistent scheduling resource within the first BWP with the network device;
wherein the memory further has executable instructions stored thereon that when executed by the processor cause the input interface to:
receive second indication information sent by the network device, wherein the second indication information indicates that an operating BWP of the terminal device is switched from a second BWP of the plurality of BWPs to the first BWP.

14. The terminal device according to claim 13, wherein the memory further has executable instructions stored thereon that when executed by the processor cause the processor to:
determine a frequency domain location of the semi-persistent scheduling resource within the first BWP according to the first indication information; and
wherein the memory further has executable instructions stored thereon that when executed by the processor cause the input interface and the output interface to:
perform, on the semi-persistent scheduling resource within the first BWP, the data transmission with the network device at a pre-configured period.

15. The terminal device according to claim 13, wherein after the input interface receives the second indication information and before the input interface receives the first indication information, the semi-persistent scheduling resource within the first BWP is in an inactive state.

16. The terminal device according to claim 13, wherein the semi-persistent scheduling resource comprises at least one of an uplink resource or a downlink resource.

17. The terminal device according to claim 13, wherein the first indication information is carried in downlink control information (DCI).

18. The terminal device according to claim 13, wherein the memory further has executable instructions stored thereon that when executed by the processor cause the processor to:
determine the semi-persistent scheduling resource within the first BWP according to a pre-configuration by the network device after the first indication information sent by the network device is received.

19. The terminal device according to claim 13, wherein the memory further has executable instructions stored thereon that when executed by the processor cause the input interface to receive a RRC signaling sent by the network device, wherein the RRC signaling is used to configure the semi-persistent scheduling resource within the first BWP for the terminal device.

20. A network device, comprising an input interface, an output interface, a processor, and a memory, wherein:
the memory has executable instructions stored thereon that when executed by the processor cause the processor to generate first indication information, wherein the first indication information indicates that a terminal device is capable of transmitting data on a semi-persistent scheduling resource within a first bandwidth part (BWP) of a plurality of BWPs and wherein the first BWP is in an active state; and
the memory further has executable instructions stored thereon that when executed by the processor cause the output interface to send the first indication information to the terminal device;
wherein the memory further has executable instructions stored thereon that when executed by the processor cause the output interface to:
send second indication information to the terminal device, wherein the second indication information indicates that an operating BWP of the terminal device is switched from a second BWP of the plurality of BWPs to the first BWP.

21. The network device according to claim 20, wherein the first indication information is carried in downlink control information (DCI).

22. The network device according to claim 20, wherein after the output interface sends the second indication information and before the output interface sends the first indication information, the semi-persistent scheduling resource within the first BWP is in an inactive state.

23. The network device according to claim 20, wherein the semi-persistent scheduling resource comprises at least one of an uplink resource or a downlink resource.

24. The network device according to claim 20, wherein the memory further has executable instructions stored thereon that when executed by the processor cause the processor to:
configure the semi-persistent scheduling resource within the first BWP for the terminal device through a RRC signaling.

* * * * *